US006115885A

United States Patent [19]

Strickler et al.

[11] Patent Number: 6,115,885

[45] Date of Patent: Sep. 12, 2000

[54] TWISTED HINGE

[75] Inventors: Mike T. Strickler; Jon Anson, both of Meridian, Id.

[73] Assignee: Hewlett-Packard Company, Palo Alto, Calif.

[21] Appl. No.: 09/123,857

[22] Filed: Jul. 27, 1998

[51] Int. Cl.[7] .......... G02C 5/22

[52] U.S. Cl. .......... 16/266; 265/267; 361/807

[58] Field of Search .......... 16/265, 266, 267; 361/807, 809, 810

[56] References Cited

U.S. PATENT DOCUMENTS

| | | | |
|---|---|---|---|
| 2,798,250 | 7/1957 | Ingram | 16/267 |
| 3,091,357 | 5/1963 | Weinhart | 16/267 |
| 4,717,216 | 1/1988 | Hornak | 16/382 |
| 4,840,514 | 6/1989 | Defrance et al. | 16/260 |
| 4,916,968 | 4/1990 | Kabaya | 16/266 |
| 5,269,046 | 12/1993 | Newby | 16/267 |
| 5,706,555 | 1/1998 | Furtner | 16/267 |
| 5,745,953 | 5/1998 | Golden | 16/260 |
| 5,791,015 | 8/1998 | Wandinger | 16/266 |

*Primary Examiner*—Anthony Knight
*Assistant Examiner*—Mark Williams

[57] ABSTRACT

A hinged door for a rack mounted electronic device includes a pair of hinges which use pins to retain the door on the device. A pair of removable mounting blocks permit the hinges to twist from a free portion to a locking portion so that in the locking position, the door is retained in a hinged relationship with the device. The pins include pin cylinders which, when the door is in the hinged relationship are retained by oppositely disposed receiving slots. The assembly of the door to the mounting blocks establishes a the mounting blocks in a position to mount the electronic device to the rack with the door fixed to the device.

27 Claims, 10 Drawing Sheets

TWISTED HINGE

FIELD OF THE INVENTION

This invention relates to hinges and closures. More particularly, the invention relates to a hinged closure useful for electronic equipment in which hinge members are located at each of two ends and the hinging hardware is concealed.

BACKGROUND OF THE INVENTION

Rack mounted electronic devices may be mounted to vertical rack columns such that a face of the electronic device extends slightly forward of the rack and the electronic device is supported by the vertical columns. In the case of equipment in which internal components are normally accessed, a cover or door may be used, such that the door can be opened without dismounting the equipment from the rack.

As described herein, the "rack mounted electronic device" is a complete component in a housing or case. It is anticipated that in many cases such a component will have little or no function unless associated with other components, and often such other components are mounted on the same or a different rack. The present invention was developed for use with computer disk drive assemblies.

In addition, some components are mounted within other components, such as disk drives within a disk drive housing. While this represents a different level of hardware assembly, the inventive concepts are the same and the invention is intended to cover such different levels of assembly.

Effects like radio frequency noise are of little concern during the time period of testing and assembly of racks of equipment. Additionally, during such assembly, there is a tendency for parts of various devices to accumulate and be lost or misidentified. Subsequent to assembly, radio frequency noise and physical shielding of electronic devices becomes more important. Therefore it is desirable that items like the door to a device remain with the device during this time. This avoids losing the door and also assures that it is not necessary to add the step of installing the door subsequent to assembly of the rack with its components, assuming the door can be identified in the first place. Since the door is on the device, it is not necessary for those later charged with supervising the rack of equipment appreciate the door's functional utility.

If the concealment of the mounting arrangement is accomplished by separate covers, it is often the case that the separate covers are either misplaced or not used. In addition to the possibility that those assembling the devices to the racks may see no point to installing the covers, often final completion of the rack is delayed, making it possible to misplace covers and the like in the interim.

It is desired to provide a door which mounts to an electronic device away from the center of the device and preferably at a location used for mounting the device to the rack columns. This places the door's mount at a location where the door and its mounts are best able to be positioned clear of the front of the device. It is further desired that the mounting arrangement for the door permit the door to hinge away from the front of the device to a maximum extent without extending beyond the frontal area of the device.

Ideally, the door should easily swing open to reveal a maximum frontal area of the component, and yet remain clear of other equipment. It may also be desired that the door be in a position which invites closing by the user. For aesthetic reasons, it is desired that the mounting hardware for the device to the rack and the door hinge assembly be concealed, thereby providing a "clean" appearance. It is also desired to conceal the mounting arrangements for the rack columns while facilitating easy mounting of the device to the rack.

The ability of the door to cover the entire face of the equipment is advantageous because the door is also used as an RFI shield for the equipment. By conveniently retaining the door, it is possible to assure that during normal operation, the door can be conveniently closed. It is desired that the hinge does not extend across the width of the door. This avoids the hinge interacting with electromagnetic fields, particularly if the hinge is formed of a ferromagnetic material. In addition, it may be desired to have the space along the hinge axis not be occupied by a hinge pin or other part of the hinge along the entire width of the device.

Hinge design, in addition to taking into consideration durability and cost, should provide the door with an ability to remain clear of the device which uses the hinge. In addition, the door should not extend beyond the height or width dimensions of the equipment in order that opening the door not be inhibited by other equipment.

In one arrangement for rack mounted equipment, mounting blocks or pillow blocks are used to mount the components to the rack columns. The mounting blocks in turn are fixed to the device. The mounting blocks are at the outer edges of the equipment, thereby making them advantageous locations for mounting hinges. It is desired, however, that assembly of the device to the rack columns be accomplished without disassembling the hinge.

SUMMARY OF THE INVENTION

According to the present invention, a hinged cover is provided in which hinge pins are fixed to mounting blocks used for mounting an electronic device to rack columns. The cover consists of a door which has slots arranged so that rotation of the mounting blocks causes the hinge pins to positively engage the door. The mounting blocks are secured to the device's chassis after rotation, so that the hinge pins remain in their positive engagement of the slots in the door.

The door, when open, reveals holes in the mounting blocks used for mounting the device to the rack columns. This allows the mounting of the device to the rack with the door open, but without removing the door. When the door is closed, the door is able to cover the mounting arrangements.

The hinge uses a "twist on" configuration which is locked in place by attachment of the mounting blocks. This allows quick removal of the hinge, quick disassembly of the hinge upon removal, and yet allows the hinged door to remain in place during normal movement of the device when the device is not in a state of disassembly. Therefore the door need not be separately attached when the device is moved or while the device rack is being configured.

The hinge consists of two horizontal "T" extensions, located respectively on each of two mounting blocks. The door has receiving slots for accepting the "T" extensions and the receiving slots open vertically from opposite sides. The opposite side openings permit the "T" extensions to be slipped into the receiving slots by twisting the "T" extensions, preferably about the center bar of the "T". After the "T" extensions are twisted, the top bar of the two "T" extensions are collinear, thereby forming a hinge axis for the door.

Each "T" extension is fixed to its mounting block at the otherwise free end of the center bar of the "T". This prevents the "T" extension from rotating unless the mounting block is rotated. Therefore, in order to effect the twisting of the "T" extensions into the receiving slots, it is necessary to pivot the mounting block about the center axis of the center bar of the "T" extension. After pivoting the "T" extensions into place in the receiving slots of the cover, the mounting blocks are mounted to the device's case, which fixes the mounting blocks and the "T" extensions against rotation. Depending on locations of flanges on the device's case and other physical constraints, the assembly of the cover with the mounting blocks can be accomplished either in whole or in part away from the case although the final assembly of the mounting blocks to the case secures the cover door onto its hinges.

This configuration provides an assembly in which the door and mounting blocks may remain assembled at all times during configuration of the rack and yet allows quick assembly and disassembly of the cover on an electronics workbench or during factory assembly. Unless openings are provided in the door, it is necessary to have the door in the open position while the device is being mounted to the rack; however it is not necessary to remove the door for such mounting.

According to a further aspect of the invention, a pivoting member such as a door has a pair of slots for receiving the cross members of a pair of "T" shaped extensions in a hinged arrangement. The slots each have an up pocket and a down pocket, so that the "T" shaped extensions can be twisted into the slots until the cross members are collinear. The pockets terminate in the collinear positions so that the door is pivotally retained about an axis defined by and extending through the cross members. The cross members thereby form pin cylinders about which the door pivots. This permits pivoting of the door in normal operation and permits pivoting of a pair of mounting blocks supporting the "T" shaped extensions during assembly.

In order to facilitate assembly, the mounting blocks are inserted into the slots and pivoted by rotating the blocks within the constraints established by the up pockets and down pockets until the blocks engage attachment locations on a chassis. The blocks are then secured to the attachment locations on the chassis, which also secures the door in its pivotal arrangement to the mounting blocks. Since the "T" shaped extensions have cross members which are limited in width, a space along the hinge line between the "T" shaped extensions is unoccupied by the hinge.

DESCRIPTION OF THE DRAWINGS

FIGS. 4 and 5 show the view from behind the door and FIG. 6 shows the view from below and behind the door;

DETAILED DESCRIPTION OF THE INVENTION

Figure 1:
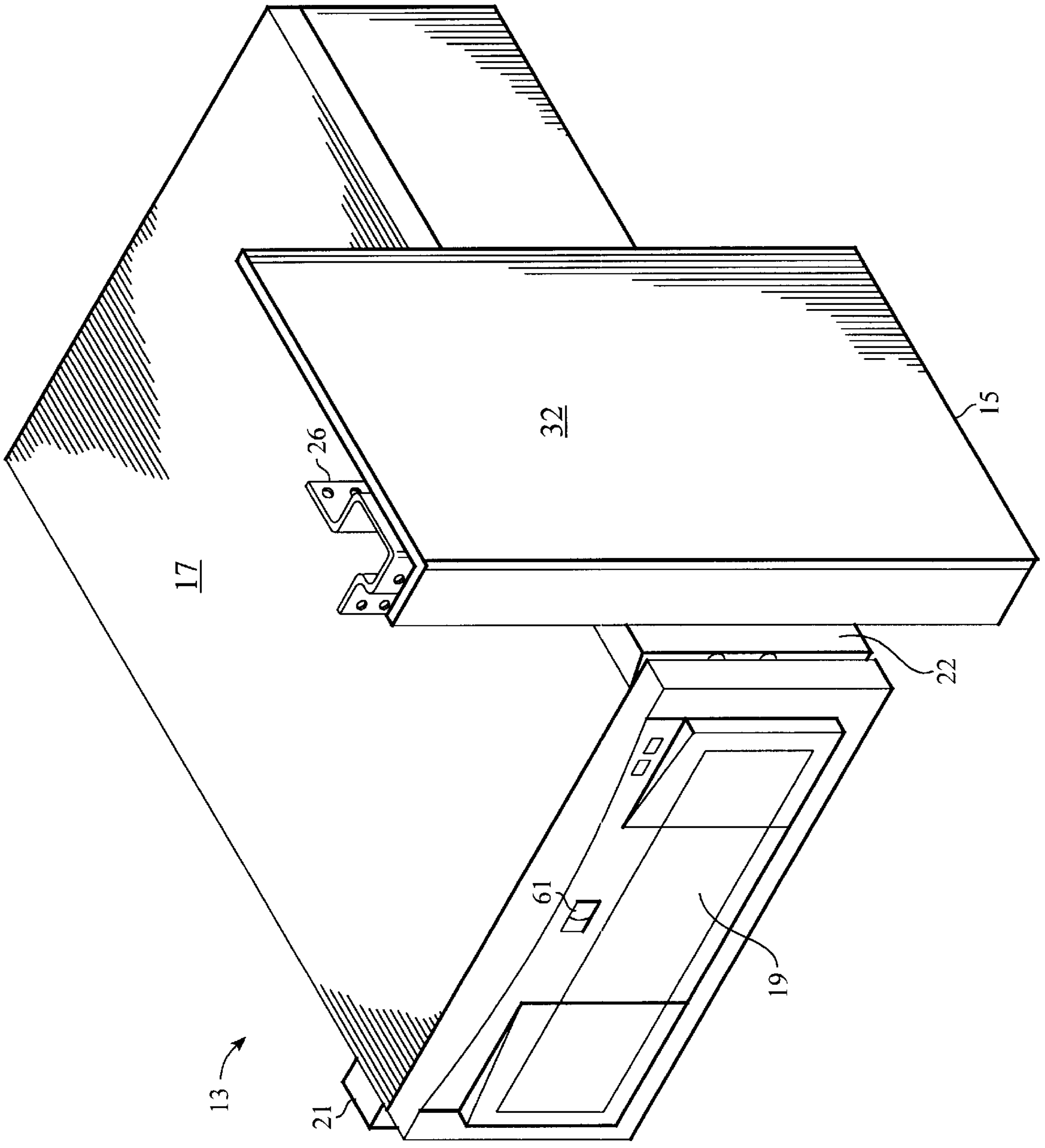
FIG. 1 shows a disk drive storage device with a hinged door as used in accordance with the present invention.

FIG. 1 shows a column or rack mounted electronic device 13. In the preferred embodiment, the electronic device 13 is a disk drive storage box which fits into an EIA standard 480 mm (19 inch) electronic equipment rack 15. The storage box 13 consists of a chassis 17 which is typically sheet metal, a bottom hinged door 19 and a pair of mounting blocks 21, 22. In the preferred embodiment the mounting blocks are die cast, but may be of any convenient construction, such as moulded plastic.

A pair of columns, such as column 26, extend vertically in the equipment rack 15, and the column is partially covered by a side panel 32. FIG. 1 is a right front view, and so the right front column 26 is seen. The equipment, such disk drive storage box 13 is front mounted, so that it is possible to mostly conceal the column 26 with the fronts of the equipment.

Figure 2:
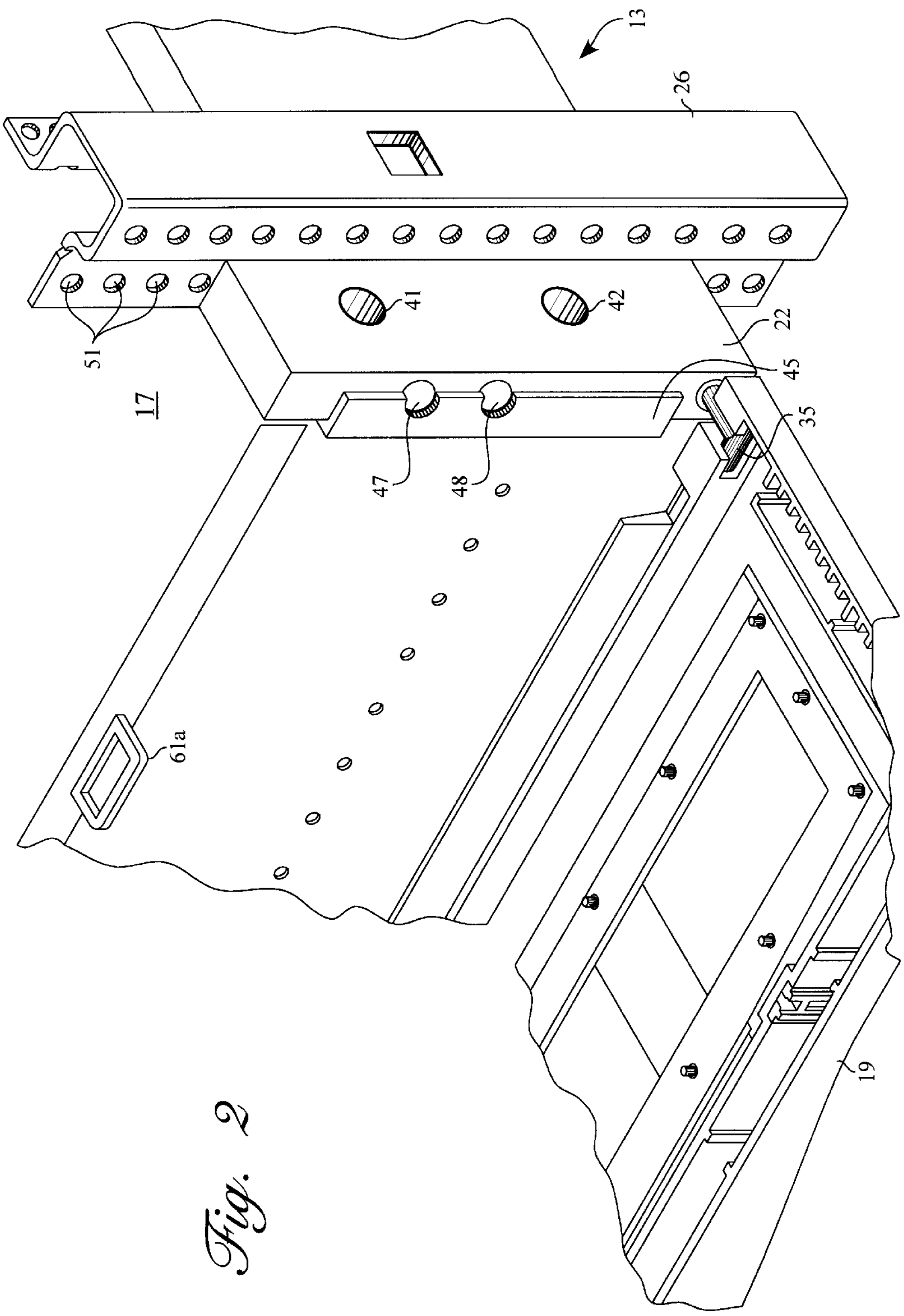
FIG. 2 shows the disk drive storage device of FIG. 1 with the door opened.

The arrangement permits the door 19 to be fully opened, as shown in FIG. 2, in order to either dismount the disk drive storage box 13 or to simply replace disk drive modules (not separately shown) within the disk drive storage box 13. In the case of replacement of the disk drive modules, the door 19 provides ready access for removal. This is particularly useful because it is often possible and desirable to "hot swap" the modules without shutting down the remaining equipment. If the disk drive storage box 13 is allowed to remain in place, there is less likelihood that unrelated connections need be disturbed during the "hot swap" operation. The need to "hot swap" disk drive modules requires that the door 19 open approximately 90 degrees without impeding other equipment in the rack 15. In addition, the door 19 must be fairly thin in order that the disk drive modules are removable when the door 19 is in the 90 degree position.

Referring again to FIG. 1, the mounting blocks 21, 22 are typically attached to the sides of the chassis 17 and are configured for mounting the chassis 17 to the columns 26. The mounting blocks 21, 22 provide good cosmetics for the gap between the door 19 and the rack side panels 32. This front mounting arrangement results in the gap being met by the blocks 21, 22 with the door 19 open, and by the door 19 itself when the door 19 is closed.

FIG. 2 shows the door 19 opened and with the rack's side panels 32 removed. As can be seen the door 19 is hinged with "T" shaped extensions 35. The "T" shaped extensions 35 are part of the mounting blocks 21, 22 (mounting block 21 shown in FIG. 1) and may be die cast as part of the mounting blocks 21, 22, or separately fixed to the mounting blocks 21, 22.

The mounting blocks 21, 22 include mounting holes 41, 42 which are used for attachment to the chassis 17. While two mounting holes 41, 42 are shown, it is possible to take advantage of the structure of the chassis 17, such as flange 45, to use a single attachment point. In addition, mounting holes 47, 48 are provided for mounting the electronic device 13 to the column 26. In this case, two mounting holes are shown which permits either two connections per mounting block or, if the spacing differs from corresponding holes 51 in the columns, at twice the increments afforded by the numbers of holes 51.

Figure 3:
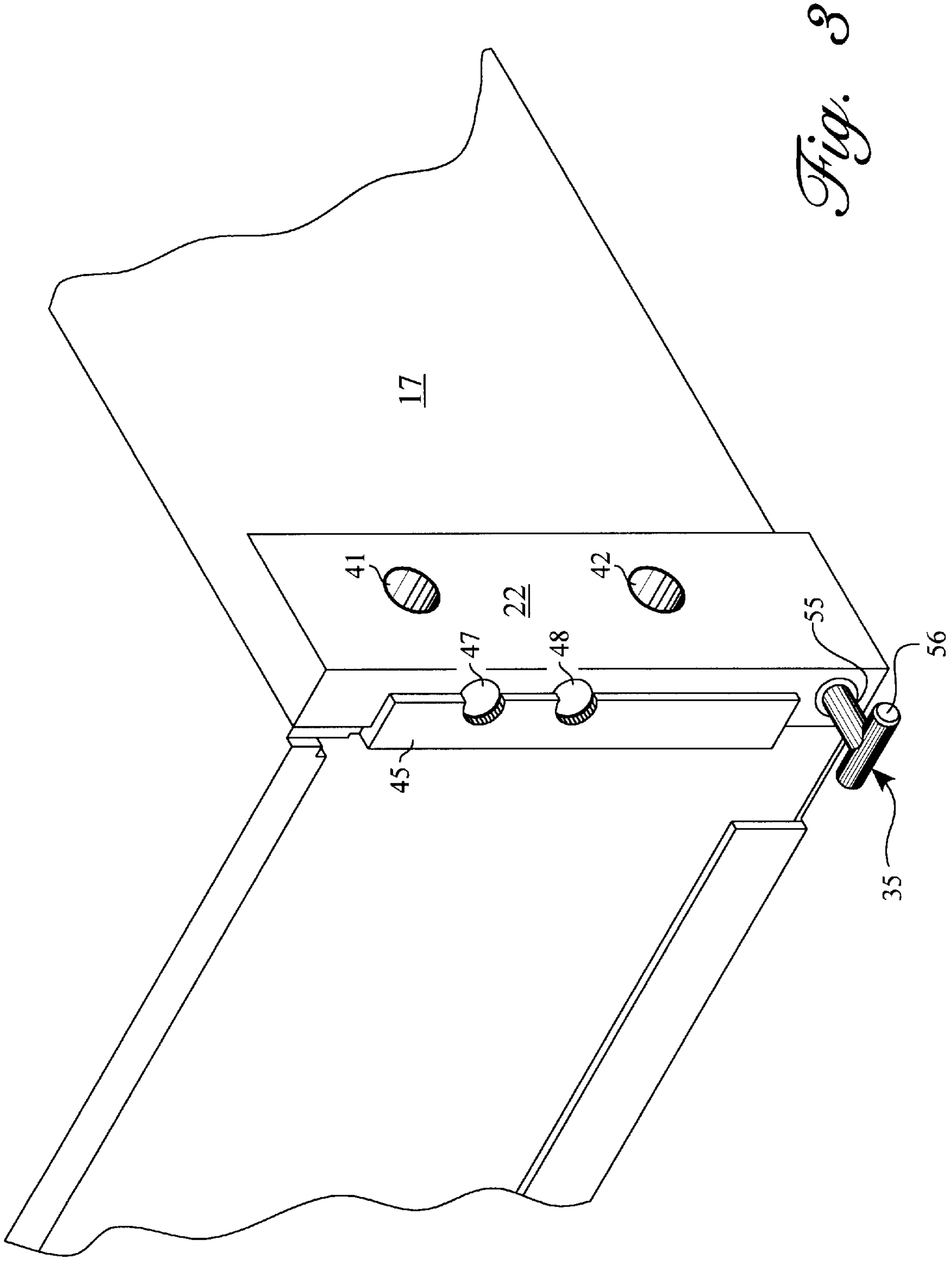
FIG. 3 shows details of a mounting block used on the device of FIGS. 1 and 2, with the door removed.

FIG. 3 shows mounting block 22 with the door 19 removed. While it is possible to assemble the electronic device 13 without the door 19 in this manner, it is intended that the door 19 be installed. The position of the "T" shaped extensions 35 is visible from this figure. The "T" shaped extensions 35 include a base shaft 55, which is the center bar of the "T" and a pin cylinder 56 which is the top bar of the "T". The pin cylinder 56 serves as the pin of the hinge. When the After the "T" shaped extensions 35 are in normal use, the pin cylinders 56 of the two "T" shaped extensions 35 are collinear, thereby forming a hinge axis for the door 19 (FIG. 2).

In the preferred embodiment, the base shaft 55 and pin cylinder 56 are at right angles. It is alternatively possible to select other angular relationships between the base shaft and the pin cylinder 56, provided that there is an angular separation between the two. The "T" shaped extensions 35 are formed as part of the mounting blocks 21, 22 as either a die casting or moulded plastic part.

Figure 4:
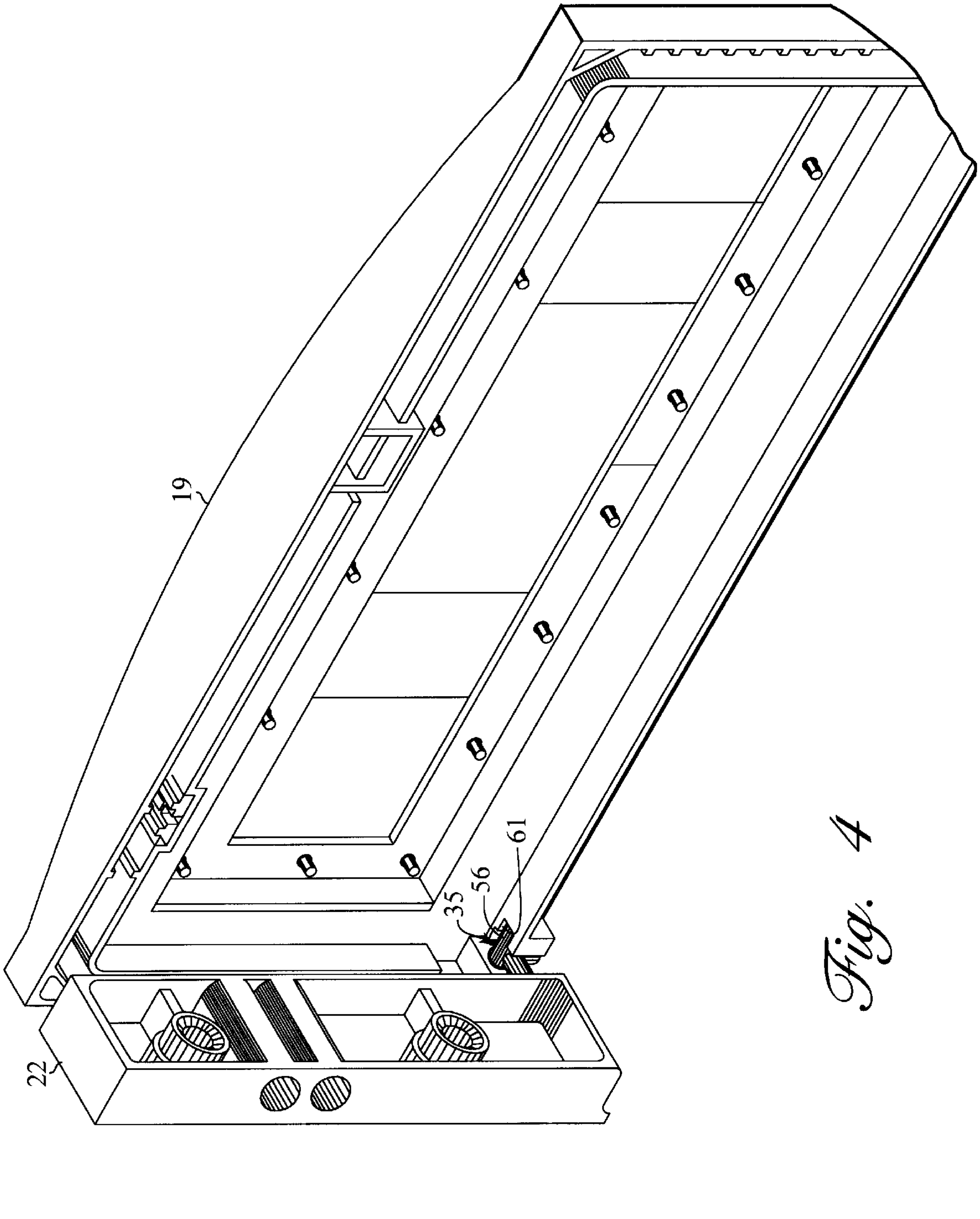
FIGS. 4–6 show the relationship of the mounting block and door.
Figure 5:
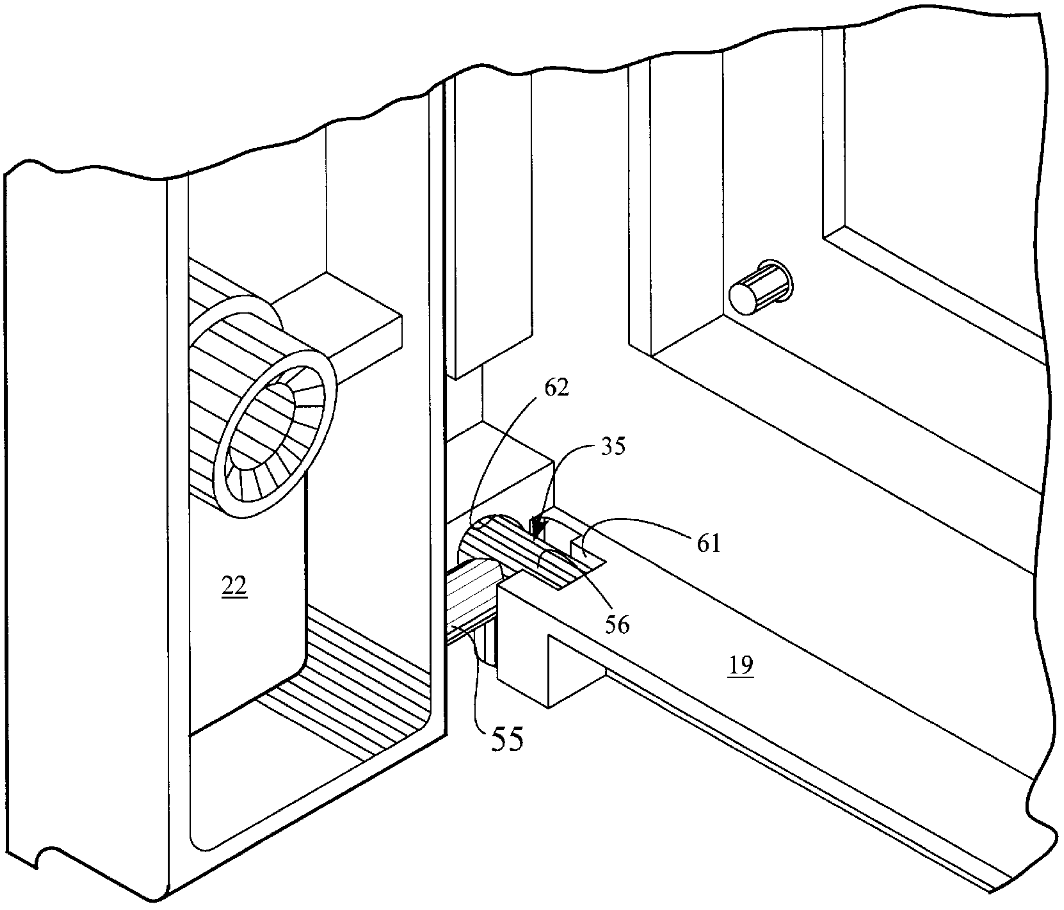
Figure 6:
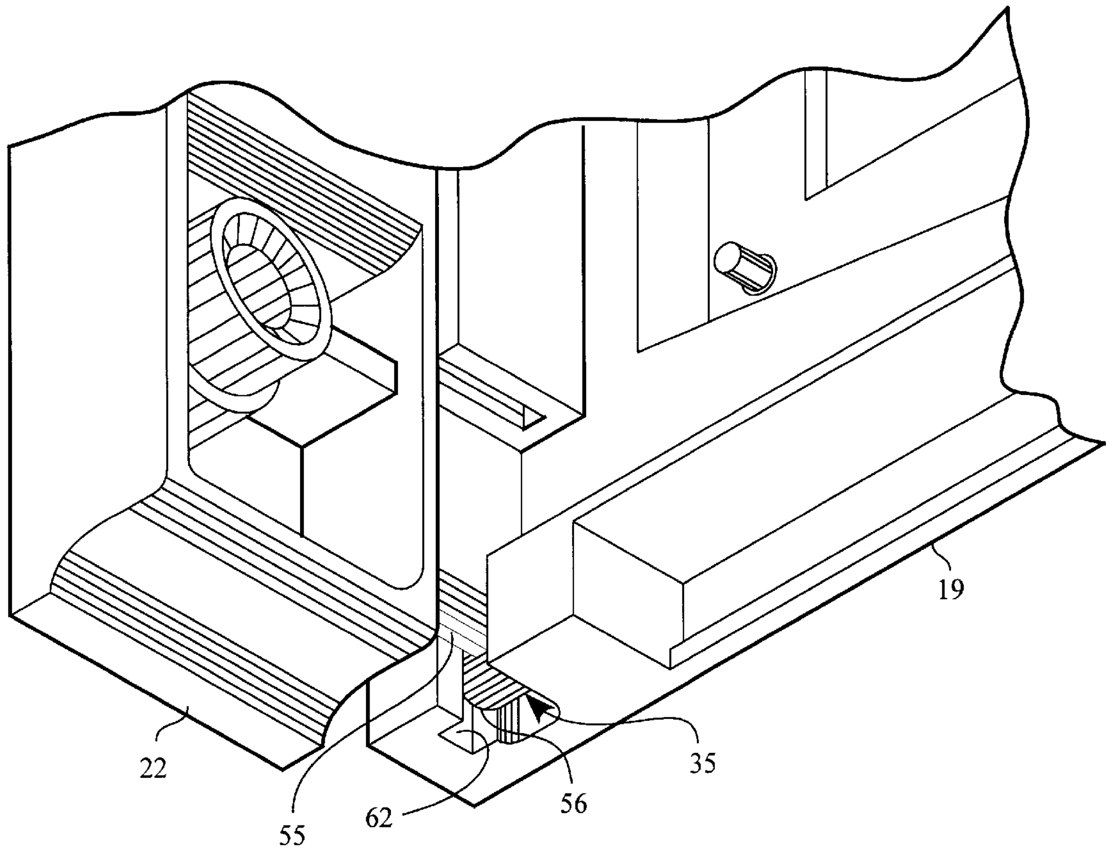

FIGS. 4–6 show mounting block 22 and the door 19 viewed from behind. The pin cylinder 56 which forms the top bar of the "T" are each received by the door 19 by a pair of receiving slots 61, 62. In each pair, one slot 61 faces upward and the other slot 62 faces downward. If the "T" shaped extensions 35 freely move, the pin cylinder 56 is able to drop out of the slots 61, 62. Since the "T" shaped extensions 35 are fixed to the mounting blocks 21, 22, the pin cylinder 56 is able to move freely into and out of the slots 61, 62 when the mounting blocks 21, 22 are free. When the mounting blocks 21, 22 are fixed to the chassis 17, the pin cylinder 56 is unable to move out of the slots 61, 62.

The pin cylinder 56 is unable to be placed into the slots 61, 62 with both of the mounting blocks 21, 22 fixed to the chassis 17. In order to assemble the door to the "T" shaped extensions 35, the mounting blocks 21, 22 are pivoted with respect to the door in a twisting movement. It is only after the "T" shaped extensions 35 are placed into the slots 61, 62 that both mounting blocks are fixed to the chassis 17.

It is possible with some geometries to assemble the door to the "T" shaped extensions 35 with one mounting block 21 or 22 fixed to the chassis, provided that the chassis 17 does not block the desired movement of the door 19 and other mounting block. Regardless, the idea is that when the blocks 21, 22 are both unmounted to the chassis 17, the door 19 can be assembled to or disassembled from the mounting blocks 21, 22, and when the blocks 21, 22 are both mounted to the chassis 17, the door 19 is retained on the pin cylinders 56.

Figure 7:
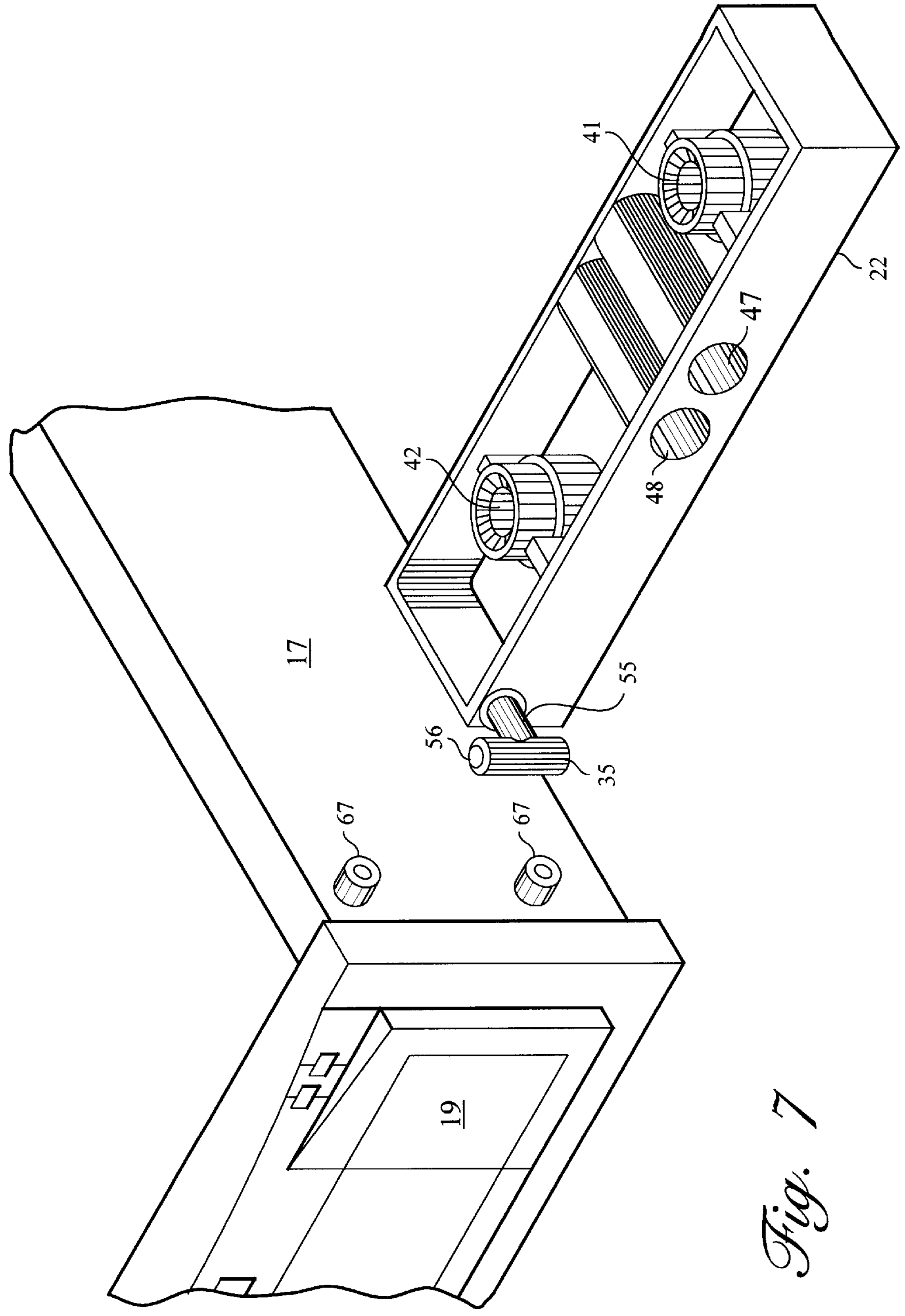
FIGS. 7 and 8 show the assembly of the mounting block to the door with the door latched to the device.
Figure 8:
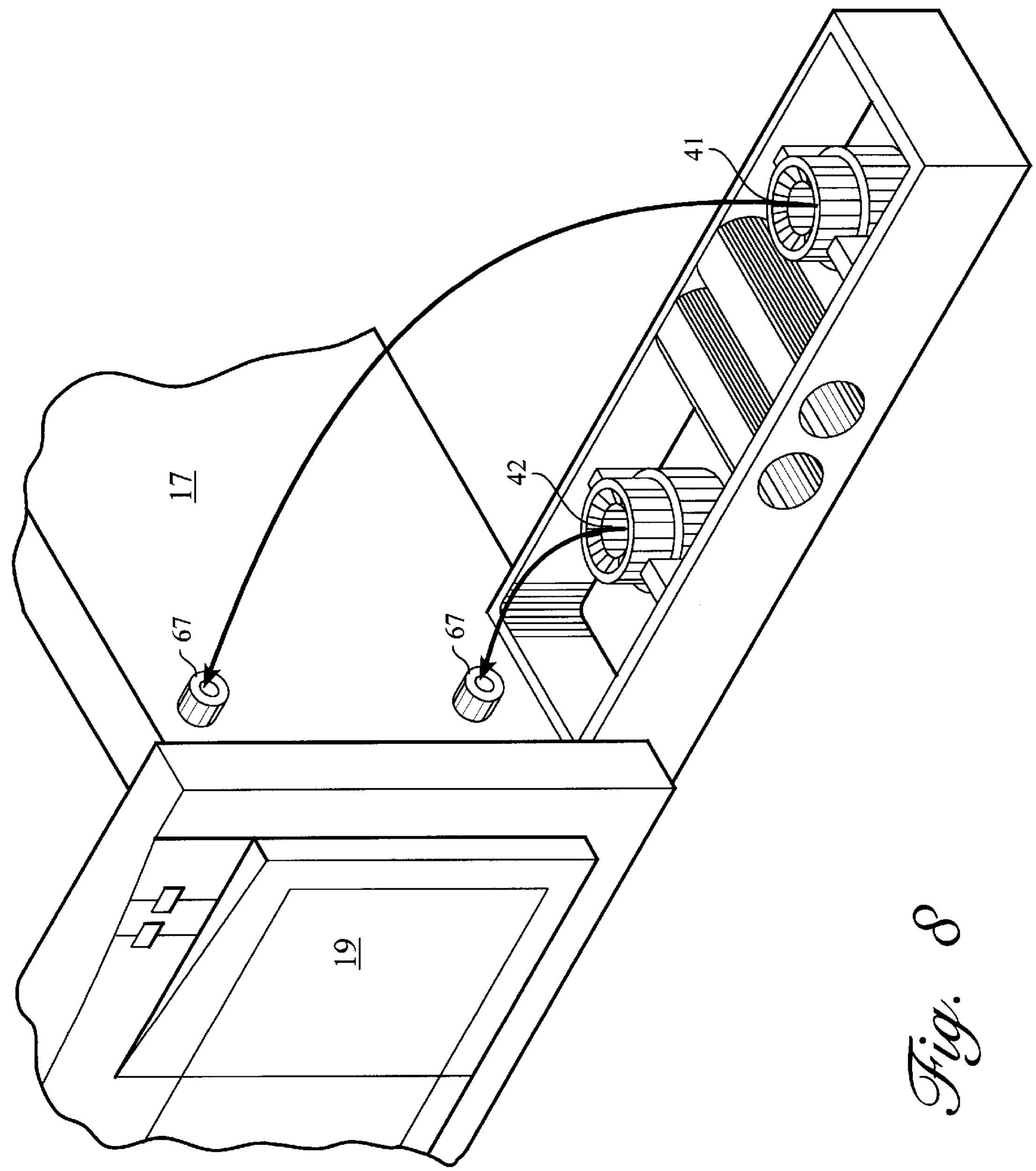

FIGS. 7–10 show the assembly of a mounting block 22 to the door 19. In FIGS. 7 and 8 the assembly takes place while the door 19 is in alignment with the chassis 17. The positioning of the door and mounting block 22 in FIGS. 9 and 10 also allow for such mounting while the door 19 is in such alignment with the chassis 17.

The door 19 and the mounting blocks 21, 22 are easily assembled to form a functioning door hinge without additional parts. The door 19 is first hung onto the chassis 17 with a pushbutton door latch 65, 65*a*, shown in FIGS. 1 and 2. Then the mounting block 22, at a right angle to its normal position is moved until the pin cylinder 56 is inserted into the door 19, as shown in FIG. 7. The pin cylinder 56 is thereby received by the slots 61, 62. Then the mounting block 22 is rotated as shown in FIG. 8, with the axis of rotation being the base shaft 55, which is the center bar of the "T" shaped extension 35. This rotation is continued until the mounting block 22 engages the chassis 17 at threaded bosses 67. This motion twists the pin cylinder 56 such that one end of the pin cylinder 56 is received by the upward facing receiving slot 61 and the other end of the pin cylinder 56 is received by the downward facing receiving slot 62. In the preferred embodiment, the mounting blocks 21, 22 are rotated approximately 90° with respect to the door 19 during assembly.

Once the mounting block 22 is mounted onto the chassis 17, the procedure is followed for the other mounting block 21. A permanent hinge is established so long as both mounting blocks 21, 22 remain fixed to the chassis 17.

Figure 9:
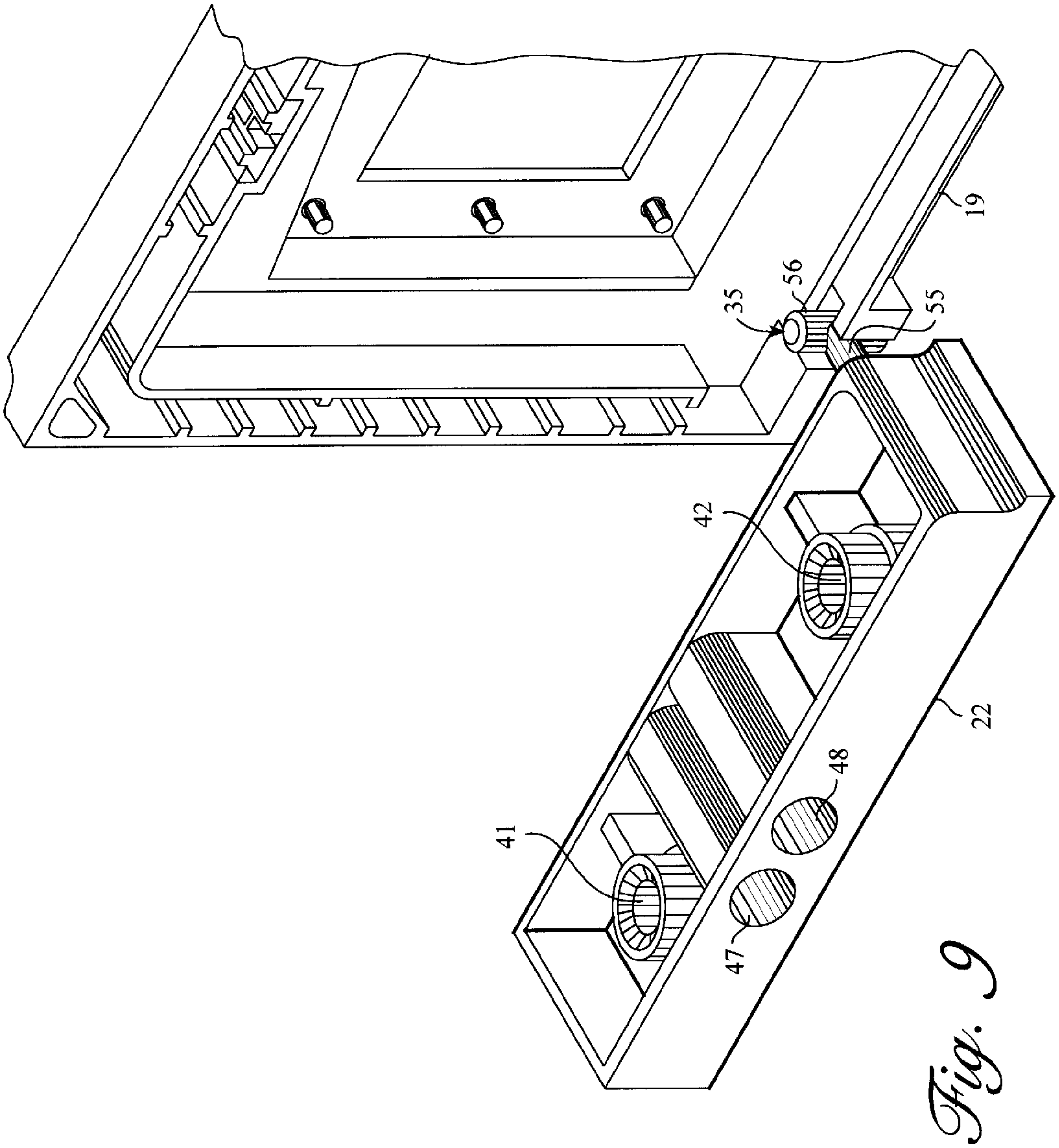
FIGS. 9 and 10 show the assembly relationships of the mounting block and the door without the device.
Figure 10:
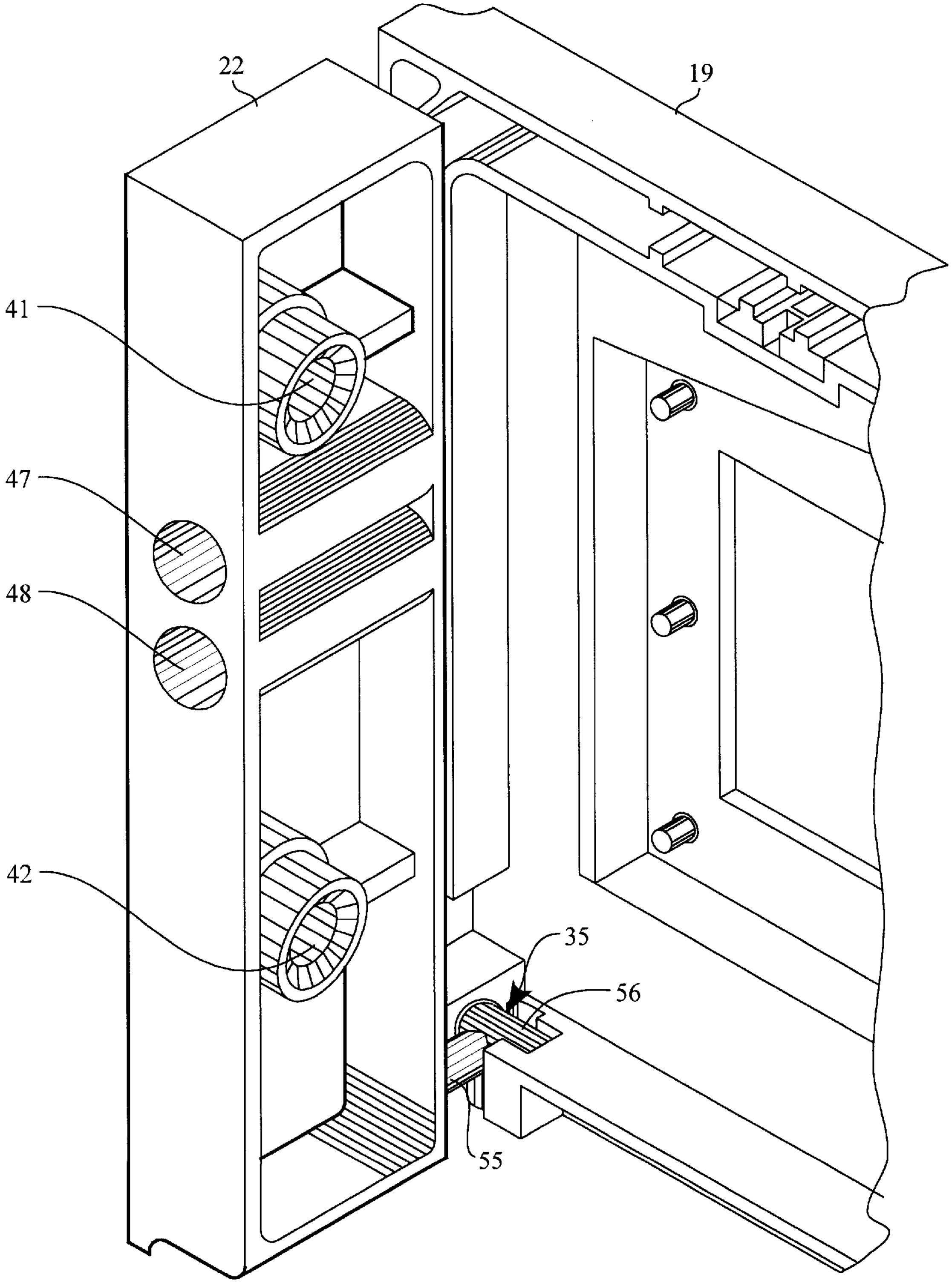

FIGS. 9 and 10 show this assembly of the door 19 to the mounting block without the chassis 17. In the preferred embodiment uses the chassis 17 as an assembly jig. FIGS. 9 and 10 show the physical relationship of the door 19 and mounting block 22 during assembly. It is nevertheless also possible to accomplish the assembly without first mounting the door 19 to the chassis 17.

After the door 19 is positioned on the pin cylinders 56, in the preferred embodiment it is necessary to have the door in the open position while the device is being fixed to the rack. This is because the door 19 covers the mounting holes 47, 48 which are provided for mounting the electronic device 13 to the column 26 (FIG. 2).

It is possible to reverse the arrangement of the "T" shaped extensions 35 by fixing the "T" shaped extensions 35 to the door and place the constraining pockets in the mounting blocks 21, 22. It is also possible to position the door at a different location such as above rather than below the center of the device 13, or with the door hinging to the right or left. While the slots 61, 62 are shown in upward and downward positions, it is possible to position the slots 61, 62 in other directions, provided that it is possible to twist the pin cylinder 56 into a position for hinging the door 19. It is also possible to accomplish the purposes of the invention with only a single "T" shaped extension 35, with a different type of cooperating hinge. In such an arrangement, the twist on feature only need apply to one side of the door. Accordingly, the invention should be read as limited only by the claims.

What is claimed is:

1. A hinge arrangement for mounting a relatively pivoting member to a stationary member, with the stationary member including at least one removable attachment, comprising:

a. a hinge pin including a support shaft and a pin cylinder having center axes with an angular separation, the support shaft fixed to one of the stationary member and the relatively pivoting member;

b. a pair of cooperating slots, open in opposite directions and receiving the pin cylinder, the slots fixed to an opposite one of the stationary member and relatively pivoting member, the hinge pin and the pair of cooperating slots establishing one of at least two hinge attachments, the hinge attachments establishing a hinge axis for rotation by the relatively pivoting member, said slots extending along a hinge line to an extent necessary to accept the hinge pins along said hinge line; and c. at least one of said two hinge attachments including the removable attachment, whereby removal of the removable attachment permits the pin cylinder to rotate onto at least one of said cooperating slots in assembly and separation of the pin cylinder from the slots and disassembly of the relatively pivoting member from the stationary member, said one of the cooperating slots having an opening which accepts the pin cylinder at an angle to said hinge line.

2. The hinge arrangement of claim 1, comprising:

a second removable attachment, each of said two hinge attachments including one of said removable attachments.

3. The hinge arrangement of claim 2, comprising:

a. the removable attachments including mounting fitments for attachment to a chassis and further including mounting locations for mounting to a support rack;

b. the mounting fitments for attachment to the chassis establishing the pin cylinder in the slots in a retained relationship with the slots during concurrent attachment of the two removable attachments to the chassis; and c. the mounting locations for mounting to the support rack permitting mounting to the support rack with the relatively pivoting member retained by retaining the pin cylinder in the slots.

4. The hinge arrangement of claim 3, comprising the support rack including vertical columns to which the removable attachments mount, the mounting locations for mounting to the support rack including bores to receive fasteners which connect the removable attachments to the vertical columns.

5. The hinge arrangement of claim 1, comprising:

a. a second removable attachment, each of said two hinge attachments including one of said removable attachments, the removable attachments including mounting fitments for attachment to a chassis and further including mounting locations for mounting to a support rack and the hinge attachments;

b. the mounting fitments for attachment to the chassis establishing the pin cylinder in the slots in a retained relationship with the slots during concurrent attachment of the two removable attachments to the chassis;

c. the pair of cooperating slots configured so that with the relatively pivoting member positioned in an opposed relationship the stationary member, the pin cylinder positions into the slots with the removable attachment in a predetermined position, whereby the slots receive the pin cylinder; and d. pivoting the removable attachment, from the predetermined position, in a predetermined direction other than the hinge axis for rotation to a mounted position of the removable attachment to the stationary member, positions the pin cylinder into a position whereby the pin cylinder received by the slots aligns with the hinge axis and the slots prevent displacement of the pin cylinders from said position.

6. The hinge arrangement of claim 5, comprising:

said mounted position permitting securing the removable attachment to the stationary member into a secured position, and further providing mounting locations established by an alignment of the removable attachment with the stationary member in the secured position.

7. The hinge arrangement of claim 5, comprising:

said opposed relationship of the relatively pivoting member and the stationary member mounted established by a latching arrangement.

8. An electronic device having a chassis which is mountable to a support structure and which includes a hinged door and rack mounts, the electronic device comprising:

a. at least one removable mounting block for mounting the chassis to the support structure, the removable mounting block and the chassis forming a stationary member with respect to normal movement of the door;

b. a hinge pin including a support shaft and a pin cylinder having center axes with an angular separation, the support shaft fixed to one of the stationary member and the door;

c. a pair of cooperating slots, open in opposite directions and receiving the pin cylinder, the slots fixed to an opposite one of the stationary member and door, the hinge pin and the pair of cooperating slots establishing one of at least two hinge attachments, the hinge attachments establishing a hinge axis for rotation by the door, said slots extending along a hinge line to an extent necessary to accept the hinge pins along said hinge line; and d. at least one of said two hinge attachments including the removable attachment, whereby removal of the removable mounting block permits the pin cylinder to rotate onto at least one of said cooperating slots in assembly and separation of the pin cylinder from the slots and disassembly of the door from the stationary member, said one of the cooperating slots having an opening which accepts the pin cylinder at an angle to said hinge line.

9. The hinge arrangement of claim 8, comprising:

a second removable mounting block, each of said two hinge attachments including one of said removable mounting blocks.

10. The hinge arrangement of claim 9, comprising:

a. the removable mounting blocks including mounting fitments for attachment to a chassis and further including mounting locations for mounting to a support rack;

b. the mounting fitments for attachment to the chassis establishing the pin cylinder in the slots in a retained relationship with the slots during concurrent attachment of the two removable attachments to the chassis; and c. the mounting locations for mounting to the support rack permitting mounting to the support rack with the door retained by retaining the pin cylinder in the slots.

11. The hinge arrangement of claim 10, comprising the support rack including vertical columns to which the removable mounting blocks mount, the mounting locations for mounting to the support rack including bores to receive fasteners which connect the removable mounting blocks to the vertical columns.

12. The hinge arrangement of claim 8, comprising:

a. a second removable mounting block, each of said two hinge attachments including one of said removable mounting blocks, the removable mounting blocks including mounting fitments for attachment to a chassis and further including mounting locations for mounting to a support rack and the hinge attachments;

b. the mounting fitments for attachment to the chassis establishing the pin cylinder in the slots in a retained relationship with the slots during concurrent attachment of the two removable attachments to the chassis;

c. the pair of cooperating slots configured so that with the door positioned in an opposed relationship the stationary member, the pin cylinder positions into the slots with the removable mounting block in a predetermined position, whereby the slots receive the pin cylinder; and d. pivoting the removable mounting block, from the predetermined position, in a predetermined direction other than the hinge axis for rotation to a mounted position of the removable mounting block to the stationary member, positions the pin cylinder into a position whereby the pin cylinder received by the slots aligns with the hinge axis and the slots prevent displacement of the pin cylinders from said position.

13. The hinge arrangement of claim 12, comprising:

said mounted position permitting securing the removable mounting block to the stationary member into a secured position, and further providing mounting locations established by an alignment of the removable mounting block with the stationary member in the secured position.

14. The hinge arrangement of claim 12, comprising:

said opposed relationship of the door and the stationary member mounted established by a latching arrangement.

15. Method of hinging door to a column mounted electronic device, the method comprising:

a. providing at least one removable mounting block for mounting a chassis to a support structure, the removable mounting block and the chassis forming a stationary member with respect to movement of the door; and b. securing the door to the chassis by positioning said removable mounting block so that a hinge pin with a pin cylinder fixed to and extending from a shaft from one of the mounting block and the door pivots into cooperating slot on the other one of the mounting block and the door, and rotating said removable mounting block until the hinge pin's cylinder rests in a hinge position in the slot, whereby removal of the removable mounting block permits the pin cylinder to rotate into said cooperating slot in assembly and separation of the hinge pin's cylinder from the slots and disassembly of the door from the stationary member, and removal of the removable mounting block permits the hinge pin's cylinder to rotate onto said cooperating slot in assembly and separation of the pin cylinder from the slot and disassembly of the door from the stationary member, said slot extending along a hinge line to an extent necessary to accept the hinge pin along said hinge line and having an opening for accepting the hinge at an angle to the hinge line for insertion of the hinge pin.

16. A hinge arrangement for mounting a relatively pivoting member to a stationary member, with the stationary member including at least one removable attachment, comprising:

a. a hinge pin including a support shaft and a pin cylinder having center axes with an angular separation, the support shaft fixed to one of the stationary member and the relatively pivoting member;

b. a pair of cooperating slots defining a hinge line, open in opposite directions and receiving the pin cylinder, the slots fixed to an opposite one of the stationary member and relatively pivoting member, the hinge pin and the pair of cooperating slots establishing one of at least two hinge attachments, the hinge attachments establishing a hinge axis for rotation by the relatively pivoting member;

c. at least one of said two hinge attachments including the removable attachment, whereby removal of the removable attachment permits the pin cylinder to rotate onto at least one of said cooperating slots in assembly and separation of the pin cylinder from the slots and disassembly of the relatively pivoting member from the stationary member, said one of the cooperating slots having an opening which accepts the pin cylinder at an angle to said hinge line; and d. a second removable attachment, each of said two hinge attachments including one of said removable attachments.

17. The hinge arrangement of claim 16, comprising:

a. the removable attachments including mounting fitments for attachment to a chassis and further including mounting locations for mounting to a support rack;

b. the mounting fitments for attachment to the chassis establishing the pin cylinder in the slots in a retained relationship with the slots during concurrent attachment of the two removable attachments to the chassis; and c. the mounting locations for mounting to the support rack permitting mounting to the support rack with the relatively pivoting member retained by retaining the pin cylinder in the slots.

18. The hinge arrangement of claim 17, comprising the support rack including vertical columns to which the removable attachments mount, the mounting locations for mounting to the support rack including bores to receive fasteners which connect the removable attachments to the vertical columns.

19. The hinge arrangement of claim 16, comprising:

a. a second removable attachment, each of said two hinge attachments including one of said removable attachments, the removable attachments including mounting fitments for attachment to a chassis and further including mounting locations for mounting to a support rack and the hinge attachments;

b. the mounting fitments for attachment to the chassis establishing the pin cylinder in the slots in a retained relationship with the slots during concurrent attachment of the two removable attachments to the chassis;

c. the pair of cooperating slots configured so that with the relatively pivoting member positioned in an opposed relationship the stationary member, the pin cylinder positions into the slots with the removable attachment in a predetermined position, whereby the slots receive the pin cylinder; and d. pivoting the removable attachment, from the predetermined position, in a predetermined direction other than the hinge axis for rotation to a mounted position of the removable attachment to the stationary member, positions the pin cylinder into a position whereby the pin cylinder received by the slots aligns with the hinge axis and the slots prevent displacement of the pin cylinders from said position.

20. The hinge arrangement of claim 19, comprising:

said mounted position permitting securing the removable attachment to the stationary member into a secured position, and further providing mounting locations established by an alignment of the removable attachment with the stationary member in the secured position.

21. The hinge arrangement of claim 19, comprising:

said opposed relationship of the relatively pivoting member and the stationary member mounted established by a latching arrangement.

22. An electronic device having a chassis which is mountable to a support structure and which includes a hinged door and rack mounts, the electronic device comprising:

a. at least one removable mounting block for mounting the chassis to the support structure, the removable mounting block and the chassis forming a stationary member with respect to normal movement of the door;

b. a hinge pin including a support shaft and a pin cylinder having center axes with an angular separation, the support shaft fixed to one of the stationary member and the door;

c. a pair of cooperating slots defining a hinge line, open in opposite directions and receiving the pin cylinder, the slots fixed to an opposite one of the stationary member and door, the hinge pin and the pair of cooperating slots establishing one of at least two hinge attachments, the hinge attachments establishing a hinge axis for rotation by the door; and d. at least one of said two hinge attachments including the removable attachment, whereby removal of the removable mounting block permits the pin cylinder to rotate onto at least one of said cooperating slots in assembly and separation of the pin cylinder from the slots and disassembly of the door from the stationary member, said one of the cooperating slots having an opening which accepts the pin cylinder at an angle to said hinge line; and e. a second removable mounting block, each of said two hinge attachments including one of said removable mounting blocks.

23. The hinge arrangement of claim 22, comprising:

a. the removable mounting blocks including mounting fitments for attachment to a chassis and further including mounting locations for mounting to a support rack;

b. the mounting fitments for attachment to the chassis establishing the pin cylinder in the slots in a retained relationship with the slots during concurrent attachment of the two removable attachments to the chassis; and c. the mounting locations for mounting to the support rack permitting mounting to the support rack with the door retained by retaining the pin cylinder in the slots.

24. The hinge arrangement of claim 23, comprising the support rack including vertical columns to which the removable mounting blocks mount, the mounting locations for mounting to the support rack including bores to receive fasteners which connect the removable mounting blocks to the vertical columns.

25. The hinge arrangement of claim 22, comprising:

a. a second removable mounting block, each of said two hinge attachments including one of said removable mounting blocks, the removable mounting blocks including mounting fitments for attachment to a chassis and further including mounting locations for mounting to a support rack and the hinge attachments;

b. the mounting fitments for attachment to the chassis establishing the pin cylinder in the slots in a retained relationship with the slots during concurrent attachment of the two removable attachments to the chassis;

c. the pair of cooperating slots configured so that with the door positioned in an opposed relationship the stationary member, the pin cylinder positions into the slots with the removable mounting block in a predetermined position, whereby the slots receive the pin cylinder; and d. pivoting the removable mounting block, from the predetermined position, in a predetermined direction other than the hinge axis for rotation to a mounted position of the removable mounting block to the stationary member, positions the pin cylinder into a position whereby the pin cylinder received by the slots aligns with the hinge axis and the slots prevent displacement of the pin cylinders from said position.

26. The hinge arrangement of claim 25, comprising:

said mounted position permitting securing the removable mounting block to the stationary member into a secured position, and further providing mounting locations established by an alignment of the removable mounting block with the stationary member in the secured position.

27. The hinge arrangement of claim 25, comprising:

said opposed relationship of the door and the stationary member mounted established by a latching arrangement.

* * * * *